United States Patent
Wunderlich et al.

(10) Patent No.: US 7,780,174 B2
(45) Date of Patent: Aug. 24, 2010

(54) DOOR SEAL FOR A TURBOMACHINE

(75) Inventors: Thomas Wunderlich, Rangsdorf (DE); Hans-Frieder Vogt, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 180 days.

(21) Appl. No.: 11/783,751

(22) Filed: Apr. 11, 2007

(65) Prior Publication Data

US 2007/0284832 A1    Dec. 13, 2007

(30) Foreign Application Priority Data

Apr. 11, 2006   (DE) ................. 10 2006 017 377

(51) Int. Cl.
 *F16J 15/02* (2006.01)
(52) U.S. Cl. ............... 277/632; 277/637; 415/173.3
(58) Field of Classification Search .......... 277/543, 277/544, 551, 630, 632, 634, 637, 640, 416, 277/650; 415/190–191, 173.3, 189, 174.2, 415/174.3
See application file for complete search history.

(56) References Cited

U.S. PATENT DOCUMENTS

| | | | |
|---|---|---|---|
| 4,126,405 A | 11/1978 | Bobo et al. | |
| 4,815,933 A * | 3/1989 | Hansel et al. | 415/189 |
| 5,118,120 A | 6/1992 | Drerup | |
| 5,236,203 A * | 8/1993 | Uchida et al. | 277/591 |
| 5,645,398 A | 7/1997 | Benoist et al. | |
| 5,797,723 A | 8/1998 | Frost et al. | |
| 6,164,656 A | 12/2000 | Frost | |
| 6,347,508 B1 * | 2/2002 | Smallwood et al. | 60/796 |
| 6,402,466 B1 | 6/2002 | Burdgick et al. | |
| 6,431,555 B1 | 8/2002 | Schroder et al. | |
| 6,464,457 B1 | 10/2002 | Morgan et al. | |
| 6,637,753 B2 * | 10/2003 | Mohammed-Fakir et al. | 277/416 |
| 6,652,229 B2 * | 11/2003 | Lu | 415/190 |

FOREIGN PATENT DOCUMENTS

| | | |
|---|---|---|
| DE | 40 06 498 C2 | 4/1999 |
| DE | 43 24 035 C2 | 2/2003 |
| EP | 1156188 | 11/2001 |
| GB | 22 33 720 A | 1/1991 |

* cited by examiner

*Primary Examiner*—Vishal Patel
(74) *Attorney, Agent, or Firm*—Timothy J. Klima; Shuttleworth & Ingersoll, PLC

(57) ABSTRACT

With a door seal for a gas turbine engine, a gap (3) existing between an axially symmetrical component (1) and an assembly formed by several segments (2) is sealed by seal doors (11), which are held via retaining holes (10) at retaining bolts (9) on one of the components, the seal doors (11) being pressed against sealing edges (5, 7) of the two components, with the sealing edges (5, 7) being disposed at a certain distance from each other. The retaining bolts and holes are located outside the pressure surface (A) of the seal doors, formed between the two sealing edges, thus preventing cooling air losses via a gap remaining between the retaining bolts and bores.

3 Claims, 2 Drawing Sheets

DOOR SEAL FOR A TURBOMACHINE

This application claims priority to German Patent Application DE10 2006 017 377.5 filed Apr. 11, 2006, the entirety of which is incorporated by reference herein.

This invention relates to a door seal for a turbomachine, more particularly a gas turbine engine, used for sealing a gap existing between an axially symmetrical component and an assembly formed by several axially symmetrically arranged segments.

Door seals are, for example, used on gas turbine engines for sealing the axially symmetrically designed combustion chamber towards a stator vane row including a plurality of axially symmetrically arranged stator vane segments to separate areas of different pressure or different air systems, respectively. Door seals include a plurality of doors moveably held on a rivet whose side faces are lodged, or forced, against both a sealing edge formed by the axially symmetrical component and a sealing edge of the respective component segment by the overpressure existing on one side. Design or thermally incurred differences in the gap size between the axially symmetrical component and the respective component segment can thus be compensated.

Optimum sealing efficiency is obtained if, in the operating condition, the sealing edges on both sides are positioned such relative to each other that the door is in a vertical position. As this position can generally not be maintained on account of tolerances and thermal expansion, the doors will assume a canted attitude and their contact with the arc-shaped sealing edges of the axially symmetrical component and the component segments will pass from a linear to a punctiform state, giving rise to leakage. This disadvantage of the known door seals is counteracted in that the sealing edges are given a linear, not an arc-shaped course, i.e. they form a chord, not an arc. This type of sealing edge configuration, in which the doors tilt over straight edges, thus providing for safe sealing throughout the whole tolerance and displacement range, requires, however, increased radial installation space for the seal configuration.

Since the individual doors are tiltably retained, via retaining holes provided in the doors, at rivets or retaining bolts radially disposed between the two sealing edges, and the hole diameter required to ensure the tilting movement is larger than the bolt diameter, disadvantageous leakage losses occur via the gap between the bolt and the hole, i.e. pressure losses or cooling air losses, respectively, in the higher-pressure secondary air zone.

In a broad aspect the present invention provides a door seal with improved sealing efficiency for the reduction of cooling air leakage in an engine.

It is a particular object of the present invention to provide solution to the above problems by a door seal designed in accordance with the features described herein.

Useful embodiments of the present invention will be apparent from the description below.

In a gas turbine engine, the gap existing between an axially symmetrical component and an assembly formed by axially symmetrically arranged segments is sealed by means of several seal doors which are tiltably held via retaining holes at retaining bolts and which separate zones of different pressure and, under the effect of a pressure force, lodge against sealing edges disposed at a certain distance from each other. In accordance with the present invention, the distance between the sealing edges is reduced and the retaining bolts and holes are located in an area outside the now smaller pressure surface. Cooling air is prevented from transgressing into the lower-pressure zone via the gap which is required between the retaining bolt and the retaining hole to enable the tilting movement to be performed, thus providing a robust secondary air system by way of a reduction of the cooling air losses.

The sealing edges are provided on first and second fins of the component and the segments of the component assembly. The retaining bolts are attached to one of the fins, with the fin provided for attachment being radially extended towards the other fin, thus reducing the distance between the sealing edges and, ultimately, the pressure surface onto which pressure is applied to force the seal door into the sealing position.

In the axially symmetrical system, the sealing edges feature a preferably straight course to further enhance sealing efficiency.

An example of the present invention is more fully described in the light of the accompanying drawings, wherein:

FIG. 1 shows a longitudinal sectional view of a door seal between an axially symmetrical component, e.g. a combustion chamber, and an assembly formed by individual axially symmetrically arranged segments, in this case, a stator vane row for a gas turbine engine consisting of individual stator vane segments.

Figure 1:
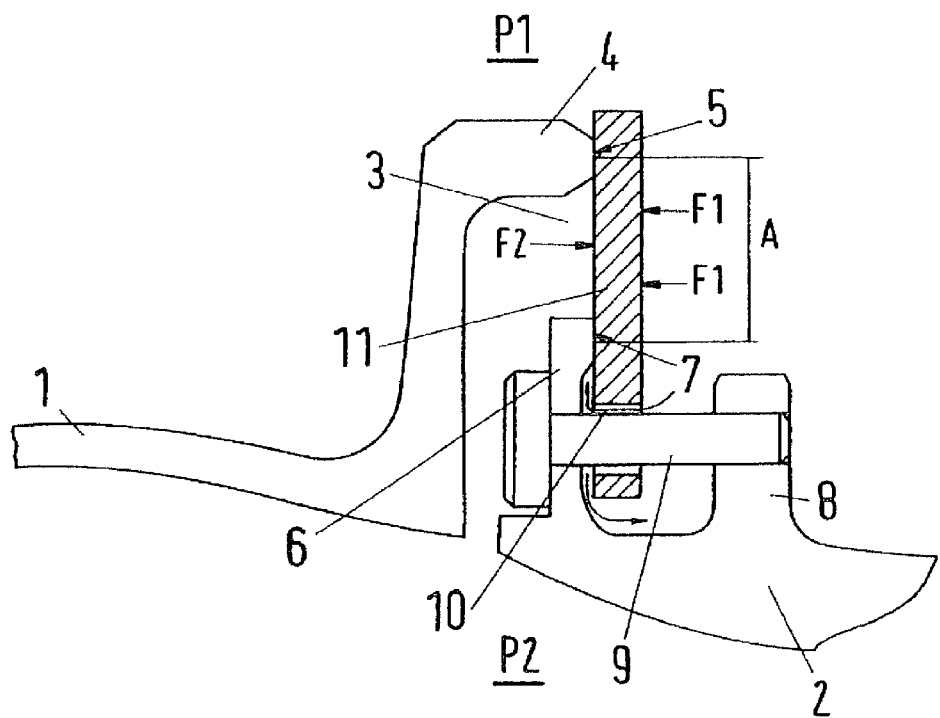
FIG. 1 shows a longitudinal sectional view of a door seal.

The gap 3 existing between the axially symmetrical component 1 and the appertaining—axially symmetrically arranged—segments 2 is sealed by a segmented door seal. The free face of a circumferential first fin 4 formed onto the axially symmetrical component 1 provides a circumferential first sealing edge 5. On a second fin 6 projecting from each segment 2 towards the circumferential fin 4, a second sealing edge 7 is provided at the upper end. Attached in the lower portion of the second fin 6 and in a locating fin 8 arranged at a certain distance from the second fin 6 is a retaining bolt 9 at which a seal door 11 is tiltably held via a retaining hole 10. The seal door 11 seals a zone of higher pressure P1 against a zone of lower pressure P2 to avoid cooling air losses.

Figure 2:
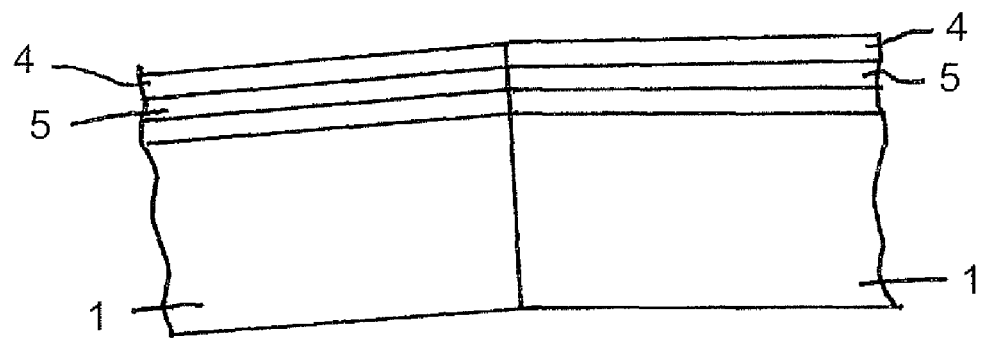
FIG. 2 shows a partial schematic axial view of chord shaped sealing edges.

The diameter of the retaining hole 10 is larger than that of the retaining bolt 9 in order to enable the seal door 11 to be tilted, thereby compensating changes and differences in the gap width caused by tolerances and thermal expansion and ultimately improving sealing efficiency. The side face of the seal door 11 lodges on the first sealing edge 5 in the upper area and on the second sealing edge 7 in the center area. The second sealing edge 7—being arranged in the center area of the seal door 11 and above the retaining hole 10—prevents transgression of cooling air from the zone of higher pressure P1 via the retaining hole 10 into the zone of lower pressure P2. It was found that the pressure force F1 acting upon the reduced pressure surface A between the two sealing edges 5 and 7 or the difference between the pressure forces F1 and F2 acting on both sides of the seal door 11, respectively, is still sufficient to ensure sealing at the sealing edges 5 and 7 preferably designed as straight lines (chords), as opposed to being in the form of arcs. See FIG. 2, which shows sealing surfaces 5 in the form of chords.

LIST OF REFERENCE NUMERALS

1 Axially symmetrical component
2 Segments
3 Gap
4 First (circumferential) fin of 1
5 First sealing edge of 4
6 Second fin of 2

7 Second sealing edge of 6
8 Locating fin of 2
9 Retaining bolt
10 Retaining hole of 11
11 Seal door
P1 Zone of higher pressure
P2 Zone of lower pressure
A Pressure surface of 11, between 5 and 7
F1, F2 Pressure forces acting on A

What is claimed is:

1. A door seal for a turbomachine, for sealing a gap between two circumferential and coaxial components of the turbomachine comprising:
    a first component of a turbomachine extending circumferentially around an axis of the turbomachine and having a first sealing edge also extending circumferentially around the axis;
    a second component of the turbomachine extending circumferentially around the axis coaxially with the first component and having a second sealing edge also extending circumferentially around the axis coaxially with the first sealing edge;
    a plurality of retaining bolts positioned circumferentially around and firmly attached to one of the components;
    a plurality of seal doors, each having at least one retaining hole for receiving a respective retaining bolt therethrough, such that the seal doors are tiltably held on the retaining bolts to simultaneously engage the first and second sealing edges of the two components and to create separate zones of different pressure sealed against each other on opposites sides of the seal doors, with the sealing edges being radially disposed at a certain distance from each other and both on one side of the sealing doors, and which are subjected to a sealing pressure force F1 acting upon a pressure area A created between the two sealing edges, the retaining bolts and retaining holes being arranged at one of radially inside of both sealing edges and radially outside of both sealing edges, to be radially outside the pressure area A and be leak free against the seal, with the size of the pressure area A being sufficient for achieving the pressure force F1 sufficient to maintain the seal doors sealed against the sealing edges solely by air pressure during operation of the turbomachine and free of assistance from other devices;
    wherein each sealing edge is formed as a plurality of chords extending circumferentially around the axis such that the sealing engagement between each sealing door and each chord-form sealing edge is in a straight line, thereby allowing the sealing door to tilt over each straight line edge while remaining in sealing straight line contact across the sealing door.

2. A door seal in accordance with claim 1, wherein the first and second sealing edges are formed on first and second fins respectively of the first and second components, with the retaining bolts being attached to one of the fins and where the fin provided for such attachment extends toward the other fin.

3. A door seal in accordance with claim 2, and further comprising a third fin extending circumferentially around the axis and positioned on an opposite side of the seal doors than the one of the first and second fins to which the retaining bolts are attached, with each of the third fin and the one of the first and second fins to which the retaining bolts are attached contacting and firmly grasping respective exterior surface portions of each retaining bolt on opposite sides of the respective seal door for additionally attaching the retaining bolts such that each retaining bolt is firmly held against movement by two fins.

* * * * *